United States Patent [19]
Lee

[11] Patent Number: 5,568,203
[45] Date of Patent: Oct. 22, 1996

[54] APPARATUS FOR ESTIMATING REAL-TIME MOTION AN A METHOD THEREOF

[75] Inventor: Soon-geon Lee, Suwon-city, Rep. of Korea

[73] Assignee: Samsung Electronics Co., Ltd., Kyungki-do, Rep. of Korea

[21] Appl. No.: 56,884

[22] Filed: May 5, 1993

[30] Foreign Application Priority Data

Oct. 27, 1992 [KR] Rep. of Korea ............ 92-19824

[51] Int. Cl.⁶ ........................... H04N 7/30; H04N 7/32
[52] U.S. Cl. ........................................................ 348/699
[58] Field of Search .................................. 358/133, 136, 358/105, 107; 348/699, 402, 407, 413, 416, 421, 390, 394, 384; H04N 7/137, 7/133, 7/08

[56] References Cited

U.S. PATENT DOCUMENTS

| | | | |
|---|---|---|---|
| 4,897,720 | 1/1990 | Wu et al. ............................. | 348/412 |
| 5,030,953 | 7/1991 | Chiang ............................... | 358/105 |
| 5,068,722 | 11/1991 | Sugiyama ............................. | 348/699 |
| 5,083,202 | 1/1992 | Parke ................................ | 348/699 |
| 5,173,771 | 12/1992 | Kitazato ............................. | 348/701 |
| 5,200,820 | 4/1993 | Gharavi ............................. | 358/105 |
| 5,206,723 | 4/1993 | Parke ................................ | 348/416 |
| 5,212,548 | 5/1993 | de Haan et al. ........................ | 348/699 |

OTHER PUBLICATIONS

"Parameterizable VLSI Architectures for the Full Search Block–Matching Algorithm", Luc DeVos & Michael Stegherr, pp. 1309–1316.

"VLSI Architectures for the Full–Search Blockmatching Algorithm", L. Dovos, M. Stegherr, T. G. Noll, pp. 1687–1690.

"VLSI Architectures For Block Matching Algorithms" T. Komarek, P. Pirsch, pp. 2457–2460.

"Array Architectures for Block Matching Algorithms" Thomas Romarch or Peter Prisch, pp. 1301–1308.

"A Family of VLSI Designs for the Motion Compeusation Block–Matching Algorithm," Kun–ming Tang, Ming–Tin Sun, and Gancelot Wu, pp. 1317–1325.

*Primary Examiner*—Thai Q. Tran
*Assistant Examiner*—Vu Le
*Attorney, Agent, or Firm*—Sughrue, Mion, Zinn, Macpeak & Seas

[57] ABSTRACT

An apparatus for estimating real-time motion in a motion compensated predicative coder for data compression of a motion image includes a previous block formation unit, a block-matching algorithm detector, minimum absolute error detecting means, a motion vector generator, and an output controller. Also, a suitable real-time motion estimating method is provided. In the present invention, to minimize the number of I/O pins, serial input system is utilized for data input from an external portion, all previous blocks and current blocks are simultaneously processed in parallel by means of a pipeline system in internal processing, and a minimum value for each group is detected together with the selection of a corresponding motion vector. As a result, a high processing speed can be achieved which enables the estimation of real-time motion.

9 Claims, 8 Drawing Sheets

APPARATUS FOR ESTIMATING REAL-TIME MOTION AN A METHOD THEREOF

BACKGROUND OF THE INVENTION

The present invention relates to an apparatus for estimating motion and a method thereof, and more particularly, to an apparatus for estimating real-time motion in a motion-compensated predictive coder for data compression of motion image data and a method thereof.

During transmission of or recording on a recording medium of motion image data, a predictive coding technique is utilized to increase data compression efficiency. Especially in data having a great amount of motion, a motion-compensated predictive coding technique is generally employed to prevent the degradation of data compression efficiency which occurs when using a simple predictive coding in which only an error signal is transmitted or recorded. In motion-compensated predictive coding, motion information is also extracted to thereby transmit and record both the error signal and motion information.

In the motion-compensated predictive coding, the block most similar to a certain block of a current frame is searched for in a fixed search area of a previous frame, and the searched block is used as a predicted value during the predictive coding. The search area is constituted by all the surrounding areas centering around the certain block of the current frame, and the relative distance from the current position to the position of the similar block of the previous frame within the search area is termed as a "motion vector" or "displacement vector." That is, the motion vector is the relative distance of the current block position and the position of the most similar previous block. Thus, an absolute value of the motion vector becomes large when the motion is great, becomes small when the motion is slight, and becomes (0, 0) when there is no motion. This search of the motion vector of the previous block having a minimum error value is called motion estimation, and is generally accomplished by a block-matching algorithm (BMA).

The BMA commonly utilizes a full search technique wherein the most similar previous block is obtained by a comparative operation in the ratio of 1:1 with the current block, with respect to all blocks formable in the search area. However, because all blocks are compared one-to-one in the full search, the resulting overflow of the comparative operation and the need for many I/O pins impede the hardware realization of a real-time motion vector estimator.

The similarity of the compared blocks is calculated by using a minimum absolute error D(i, j), which can be written as:

$$D(i,j) = \sum_{m=0}^{M-1} \sum_{n=0}^{N-1} |a(m,n) - b(m+1, n+j)|$$

where a(m, n) designates a current pixel value, b(m+j, n+j) is a previous pixel value, and (i, j) is a motion vector value.

Among the D(i, j) values, the relative position of the previous block having the minimum error value with respect to the current block becomes the motion vector. The following characteristics exemplify the operation amount and processing speed required for realizing the hardware for real-time motion estimation:

data rate: 13.5 MHz current block size: 256 pixels (16×16)

motion vector range: $-8 \leq i, j \leq 7$ search window size: 961 pixels (31×31)

previous block size: 256 pixels (16×16)

number of the previous block: 256

Here, the total operating number of the full search technique is 256×256 for each block, and 256 operations are required for each pixel. Since a subtraction operation, absolute value calculation and accumulation must be performed for each operation, real-time processing requires 256 operations for each pixel period, which requires approximately 0.29 ns per data. Therefore, it can be appreciated that, when the processing is carried out per data, real-time processing is difficult due to the relation between the required total number of operations and the processing speed.

SUMMARY OF THE INVENTION

It is an object of the present invention to solve the above-described problem in the prior art by providing an apparatus for estimating real-time motion by using a motion-compensated predictive coder capable of real-time processing of motion image data, and a method suitable for the apparatus.

It is another object of the present invention to provide an apparatus for estimating real-time motion capable of minimizing the number of I/O pins in a single chip.

To achieve the above objects, the present invention provides a motion estimation apparatus for performing one-to-one comparison of a current pixel block having a size of M lines×N dots with a plurality of previous pixel blocks having a size of M lines×N dots within a search window having a size of (2M−1)lines×(2N−1)dots in order to obtain relative position information between the current pixel block and a previous pixel block most similar to the current pixel block, said relative position information representing motion information, wherein the apparatus for estimating real-time motion comprises:

previous block formation means for simultaneously inputting first and second serial pixel data strings within the search window, and sequentially outputting in parallel the serial pixel data strings corresponding to the respective previous pixel blocks;

block-matching algorithm processing means for sequentially inputting the serial pixel data strings, outputted from the previous block formation means, and a third serial pixel data string of the current pixel block to simultaneously perform one-to-one comparison of the plurality of previous pixel blocks with the current pixel block in parallel, thereby outputting in parallel the respective absolute error data strings of the plurality of previous blocks with respect to the current pixel block;

minimum absolute error detecting means for inputting and dividing the parallel absolute error data strings into a plurality of groups, obtaining minimum absolute error data of each group, and comparing the minimum absolute error data of the groups to one another, thereby producing a minimum absolute error data within the search window;

motion vector generating means for generating a motion vector corresponding to the minimum absolute error data produced in the search window, by being synchronized to the operation of the minimum absolute error detecting means for obtaining the minimum value; and output controlling means for outputting the absolute error data of a motion vector (0, 0), the produced minimum absolute error data, and the generated motion vector to an I/O bus, and selectively outputting the absolute error data among a plurality of absolute error data strings corresponding an external motion vector input via the I/O bus.

That is, through the above-described construction in the present invention, the pixel values of the current block and the previous block within the search are sequentially input to thereby minimize the I/O pin numbers, so that the realization of a VLSI is facilitated. Also, by including processing elements which are the same as the previous block numbers, the operation simultaneously begins and ends in parallel, thereby performing a real time operation. Here, the transmission of pixel data required for each processing element is carried out such that pixel data of the current block is simultaneously transmitted, and the pixel data of the previous block is transmitted by means of a horizontal and vertical pipeline system. By this transmission line structure, the apparatus for estimating motion has a systematic bus structure and the I/O pin number can be minimized. Furthermore, in order to produce a minimum absolute error, the error data is divided into a plurality of groups, the divided error data is simultaneously compared per group, and then each minimum absolute error of each group is compared, thereby producing the final minimum absolute error. The circuitry is simplified and the signal delay is shortened, thus an effective hardware can be realized.

Moreover, according to the present invention, an error value with respect to a certain motion vector from an external unit can be output.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
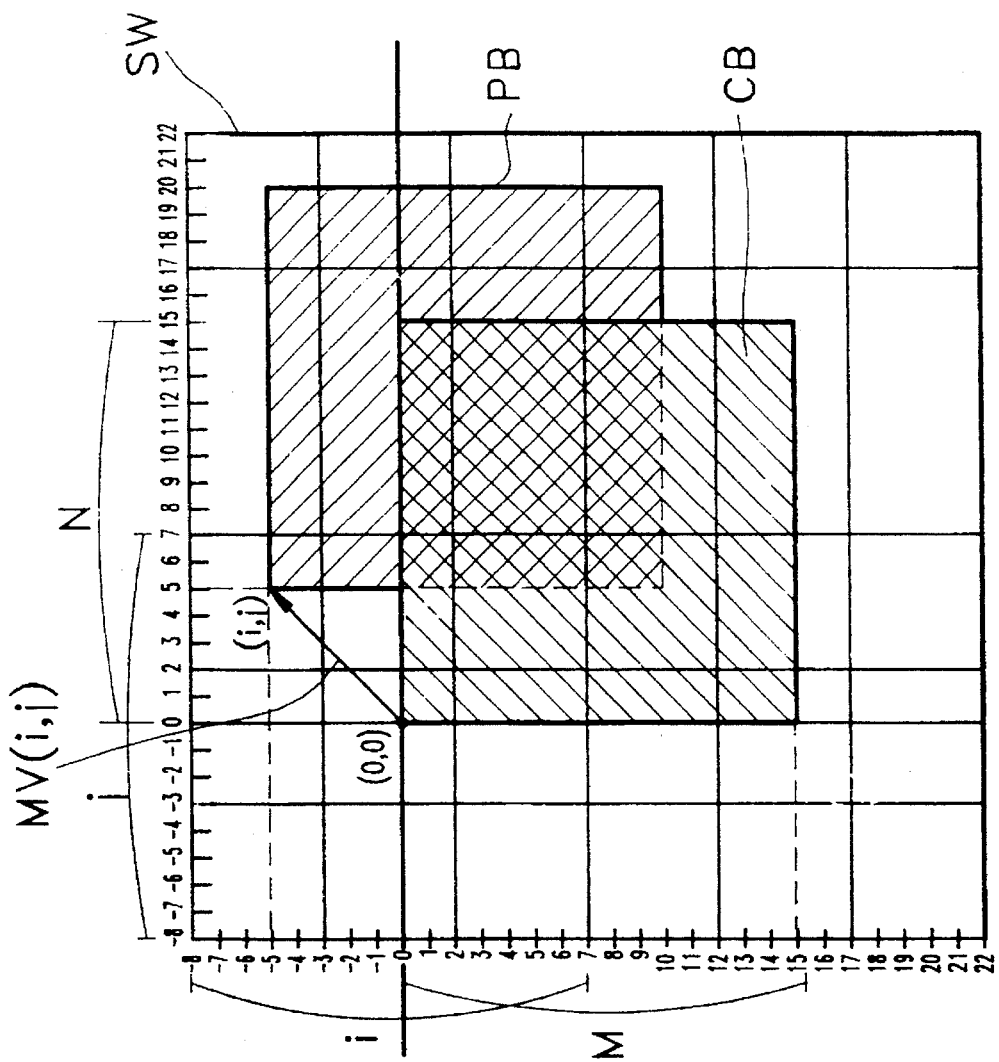
FIG. 1 is a view for explaining the concept of motion estimation.

In FIG. 1, a reference symbol CB designates a current block size of M lines×N dots in the current frame, wherein M=N=16. SW is a search area in a previous frame, i.e., a search window size of (2M−1)lines×(2N−1)dots. Therefore, the search window includes M×N previous blocks (PB) having the same size as current block CB. Search window SW sets the left uppermost pixel position of current block CB as reference coordinates (0, 0), and the left upper most pixel position of the M×N previous blocks PB have respective coordinates from −8 to M+6 in the vertical direction and from −8 to N+6 in the horizontal direction. Accordingly, i and j of motion vector MV(i, j) which represents the relative displacement from the left uppermost pixel position of current block CB to the left uppermost pixel position of each previous block PB, exist within the range of $-8 \leq j, i \leq 6$. The motion estimation is carried out in such a manner that a subtraction operation is performed such that the 256 pixels in current block CB are subtracted from the corresponding 256 pixels in the previous block, and then absolute values of the subtracted difference values are obtained. A previous block whose sum of 256 absolute values is minimum is assumed, for explanation purposes, to be in the 145° oblique-lined portion, and motion vector MV(i, j) and a minimum absolute error D(i, j) having the above minimum sum are provided as motion estimation data.

Figure 2:
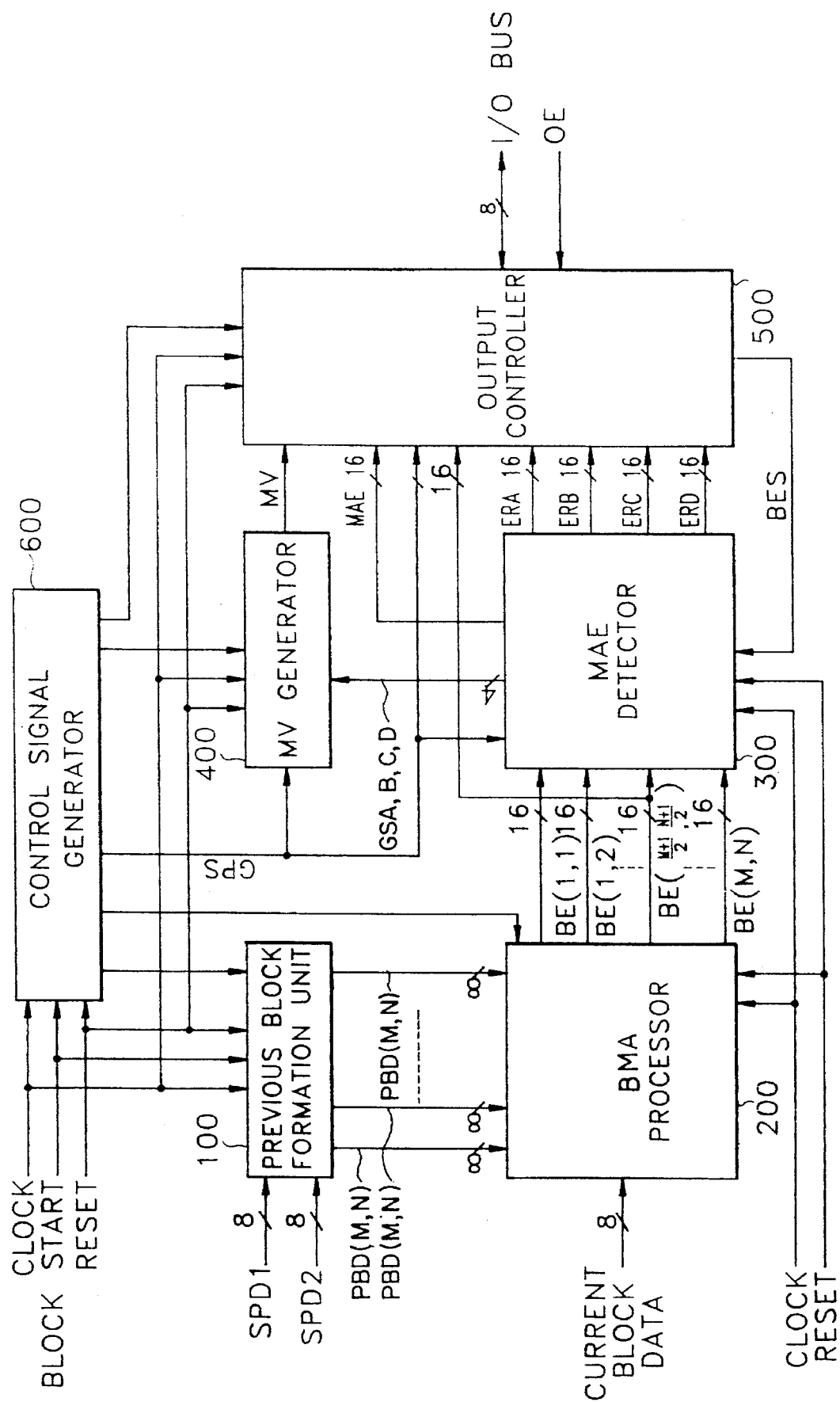
FIG. 2 is a block diagram showing an apparatus for estimating real time motion according to the present invention.

FIG. 2 illustrates a block diagram showing an apparatus for estimating real-time motion according to the present invention. The apparatus includes a previous block formation unit 100, a block-matching algorithm (BMA) processor 200, a minimum absolute error (MAE) detector 300, a motion vector (MV) generator 400, an output controller 500, and a control signal generator 600.

Figure 3:
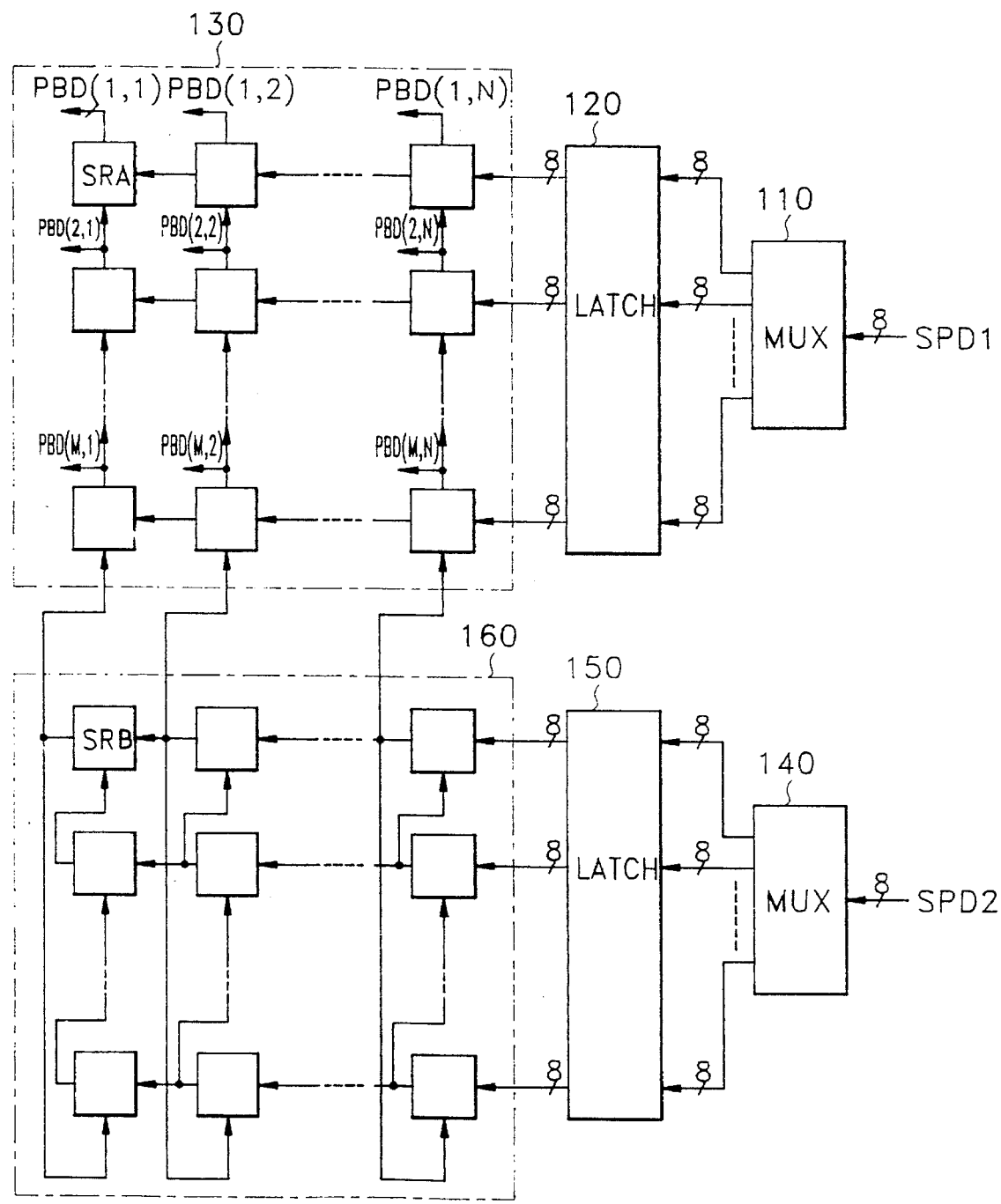
FIG. 3 is a circuit diagram of the previous block formation unit shown in FIG. 2.

Previous block formation unit 100 receives first and second serial pixel data strings SPD1 and SPD2 within a search window, and sequentially outputs block pixel data strings PBD in parallel corresponding to all previous blocks PB(i, j) within the search window, respectively. Referring to FIG. 3, previous block formation unit 100 includes a first demultiplexer 110, a first latch 120, an M×N first shift register matrix 130, a second demultiplexer 140, a second latch 150, and an (M−1)×N second shift register matrix 160. First demultiplexer 110 sequentially receives the pixel data string of upper sixteen rows of the search window for each column and demultiplexes the received pixel data strings to be supplied on a row by row basis to first latch 120. First latch 120 outputs in parallel the latched pixel data of the upper sixteen rows by a first predetermined clock period. M×N first shift register matrix 130 leftward-horizontally shifts the parallel pixel data of the upper sixteen rows supplied from first latch 120 by a second predetermined clock period, and upward-vertically shifts them by a third predetermined clock period. Corresponding to each previous block PB within the search window, each first shift register SRA forms the M×N pixel data of the corresponding previous block PB into serial data PBD(x, y) to thereby output the serial data. Accordingly, M×N first shift register matrix 130 simultaneously outputs each serial data string of M×N previous blocks in parallel.

Second multiplexer 140 sequentially inputs pixel data strings of the lower fifteen rows of the search window per column, and demultiplexes the input pixel data strings to be supplied to second latch 150. Second latch 150 outputs in parallel latched pixel data of the lower fifteen rows by the first predetermined clock period. (M−1)×N second shift register matrix 160 leftward-horizontally shifts the parallel pixel data of the lower fifteen rows supplied from second latch 150 by the second predetermined clock period, and upward-vertically and recursively shifts them by the third predetermined clock period. The second shift registers SRB at the uppermost line are connected so as to supply data to the first shift registers SRA at the lowest line of M×N first shift register matrix 160.

Figure 4:
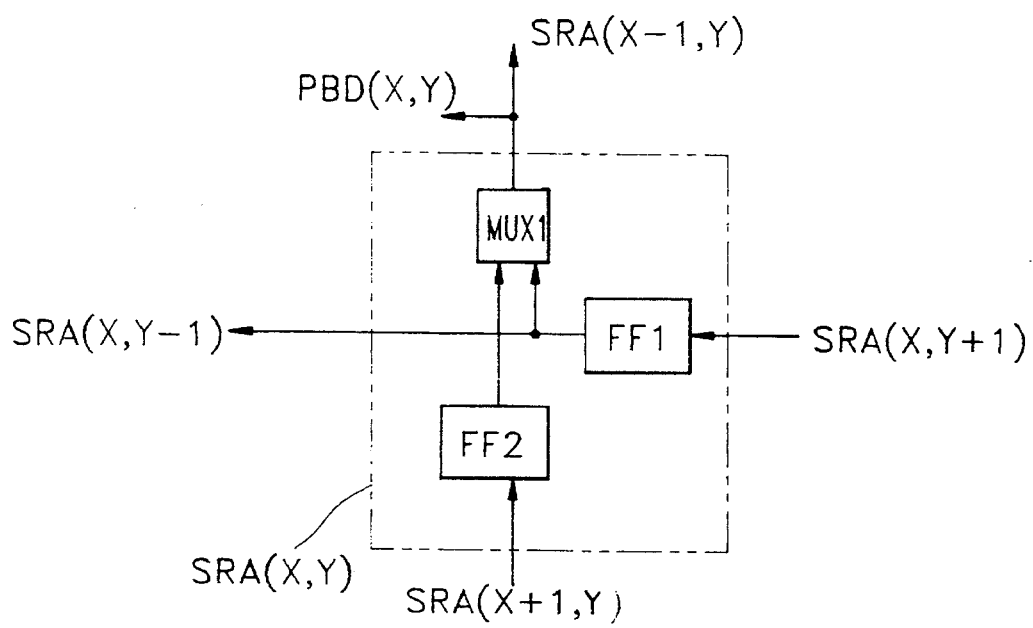
FIG. 4 is a circuit diagram showing the construction of the first shift register shown in FIG. 3.
Figure 5:
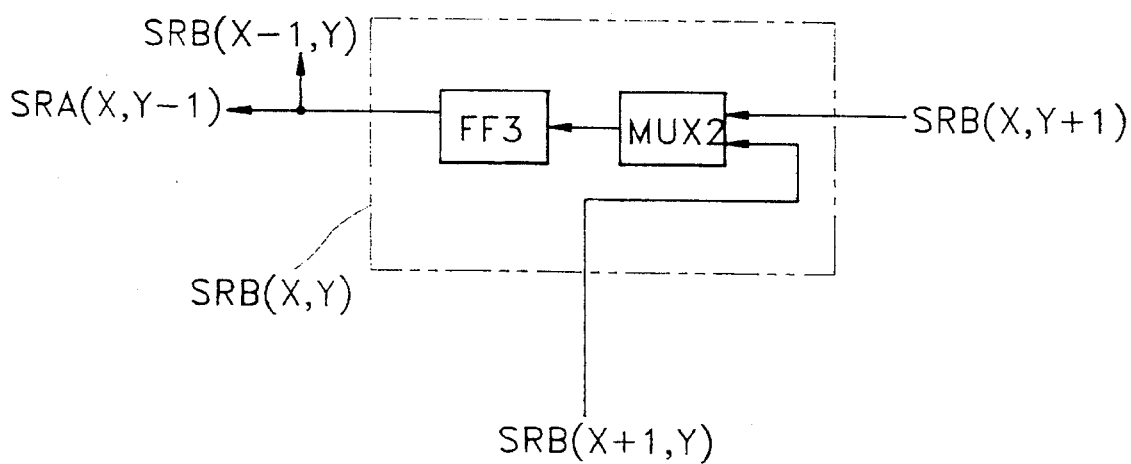
FIG. 5 is a circuit diagram showing the construction of the second shift register shown in FIG. 3.

Referring to FIG. 4, first shift register SRA has a first flip-flop FF1 for horizontal-shifting, a second flip-flop FF2 for vertical-shifting and a multiplexer MUX1 for selectively outputting the outputs of first and second flip-flops FF1 and Referring to FIG. 5, second shift register SRB has a multiplexer MUX2 for selecting data supplied from registers on the right and lower parts of multiplexer MUX2 and a flip-flop FF3 for supplying the data which is selected in multiplexer MUX2 to the registers on the left and upper parts of multiplexer MUX2 according to a clock signal.

It can be appreciated that as a result of orderly shifting of the pixel data leftward and upward, successive previous blocks PB appear within the M×N stages of register 130. Thus, the initial blocks PB having the upper left most pixel at (−8, −8) will first appear and all pixel data for the initial previous block is output in parallel from the M×N stages of register 130. A subsequent shift of all pixel data either leftward or upward has the effect of putting another previous block in shift register 130, etc. In this manner all previous blocks within the search window are entered into register 130 and the pixel data for each previous block outputted in parallel.

Figure 6:
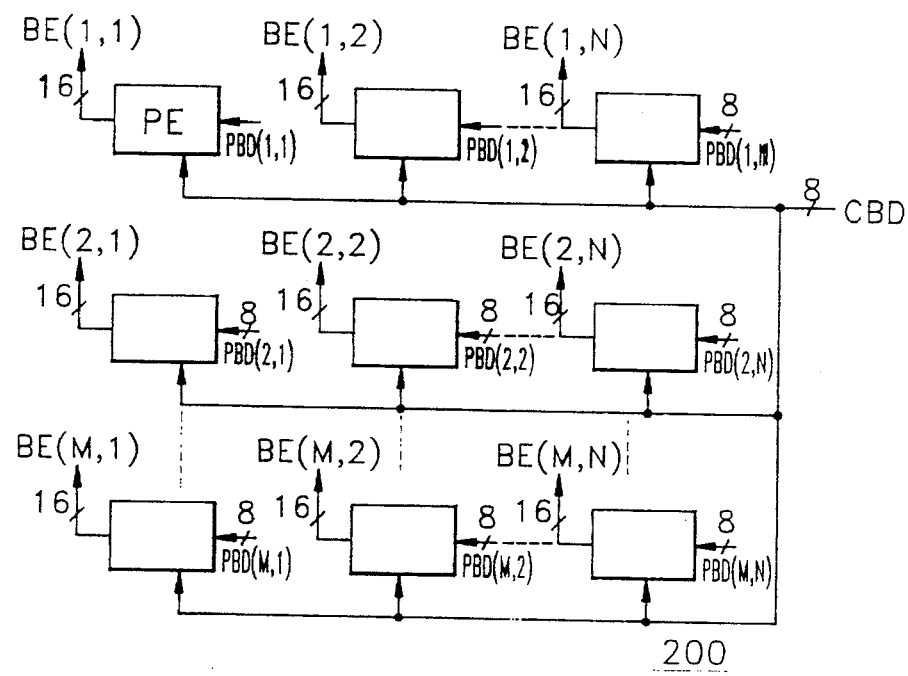
FIG. 6 is a circuit diagram of the block-matching algorithm operation processor shown in FIG. 2.
Figure 7:
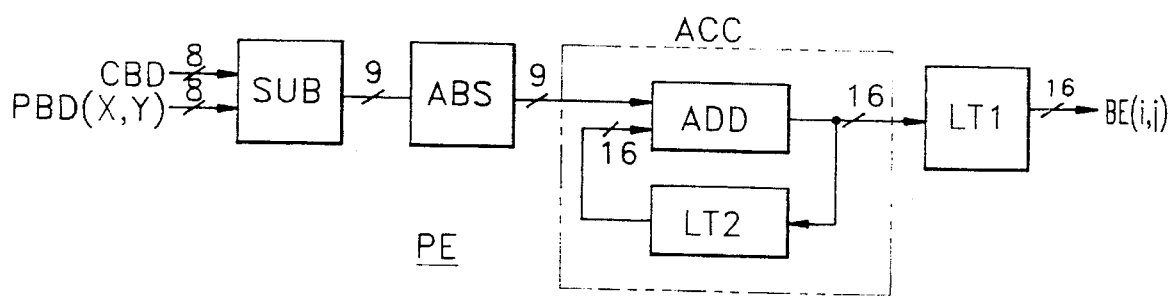
FIG. 7 is a circuit diagram showing the construction of a processing element shown in FIG. 6.

Referring to FIG. 6, BMA operation processor 200 includes an M×N processing element PE matrix corresponding to M×N previous blocks. Referring to FIG. 7, each processing element PE has a subtractor SUB for performing the subtraction of a pixel data string CBD of current block CB and pixel data string PBD(x, y) of a previous block PB(x, y), an absolute value producer ABS for obtaining the absolute value of the output from subtractor SUB, an accumulator ACC for accumulating absolute values with respect to M×N pixel data, and an output latch LT1 for outputting the accumulated value of accumulator ACC as an error BE(i, j) with respect to current block CB and previous block PB. Accumulator ACC has an adder ADD and a vertical latch LT2.

Therefore, BMA operation processor 200 simultaneously generates M×N errors BE(i, j) for M×N previous blocks PB with respect to current blocks CB by real-time processing.

Figure 8:
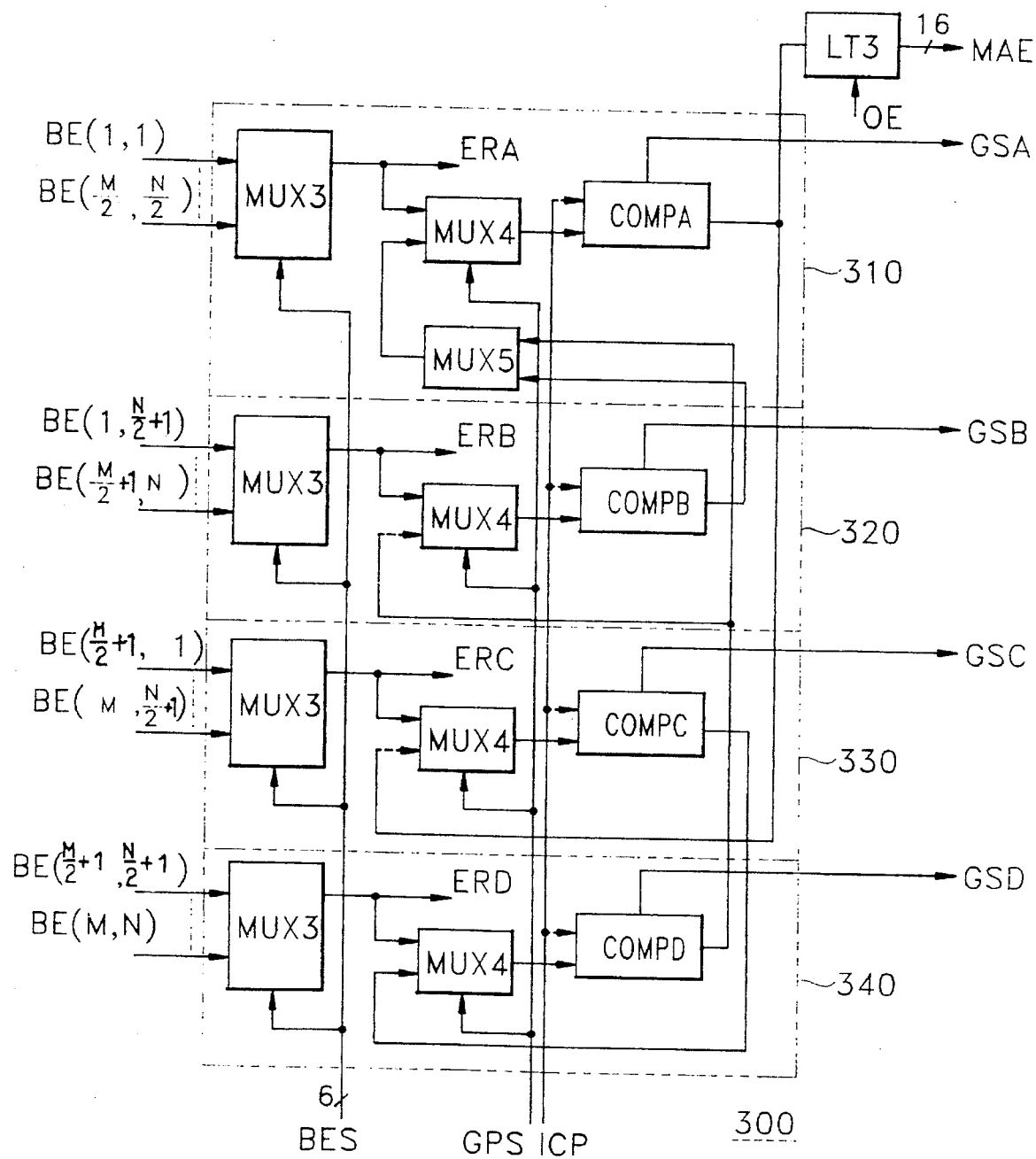
FIG. 8 is a circuit diagram of the minimum absolute error detector shown in FIG. 2.

Referring to FIG. 8, MAE detector 300 has four group minimum detectors 310, 320, 330 and 340 to produce a group minimum error per group. This is obtained by dividing the error into four groups, a first group of $$BE(1,1) \sim BE\left(\frac{M}{2}, \frac{N}{2}\right),$$

a second group of $$BE\left(1, \frac{N}{2}+1\right) \sim BE\left(\frac{M}{2}+1, N\right),$$

a third group of $$BE\left(\frac{M}{2}+1, 1\right) \sim BE\left(M, \frac{N}{2}+1\right)$$

and a fourth group of $$BE\left(\frac{M}{2}+1, \frac{N}{2},+1\right) \sim BE(M, N).$$

Each group minimum detector includes a first multiplexer MUX3 for parallel inputting errors BE of the corresponding group to thereby generate serial error data strings ERA, ERB, ERC and ERD in response to an error selection signal BES, a second multiplexer MUX4 for selecting the serial error data string and group minimum error data supplied from another group in response to a group selection signal GPS, and a comparator COMP for initially inputting to the comparator a control signal ICP for selecting the first error value of each group with the output of second multiplexer MUX4, and latching the smaller value between two inputs according to the result of the comparison. First group minimum detector 310 further includes a third multiplexer MUX5 for selecting the minimum value of the second group detected by means of the second group minimum detector 320 and the minimum value of the fourth group detected by means of the fourth group minimum detector 340, to thereby supply the selected value to the second multiplexer MUX4 thereof as the minimum value of another group. The minimum value is obtained by means of the comparison between the first and second groups, between the second and fourth groups, between the third and first groups and between the fourth and the third groups. Then, the final outputs of the first and third groups are compared with each other, so that a final minimum absolute error. MAE is output via an output latch LT3. Output latch LT3 responds to an output enable signal OE. Each comparator COMPA through COMPD respectively outputs selection signals GSA through GSD corresponding to the minimum value determined after the comparison.

Therefore, in order to speed up the comparing detection, MAE detector 300 performs the comparison per four groups, and outputs final minimum absolute error MAE by comparing the minimum values of respective blocks with each other on a per block basis.

Figure 9:
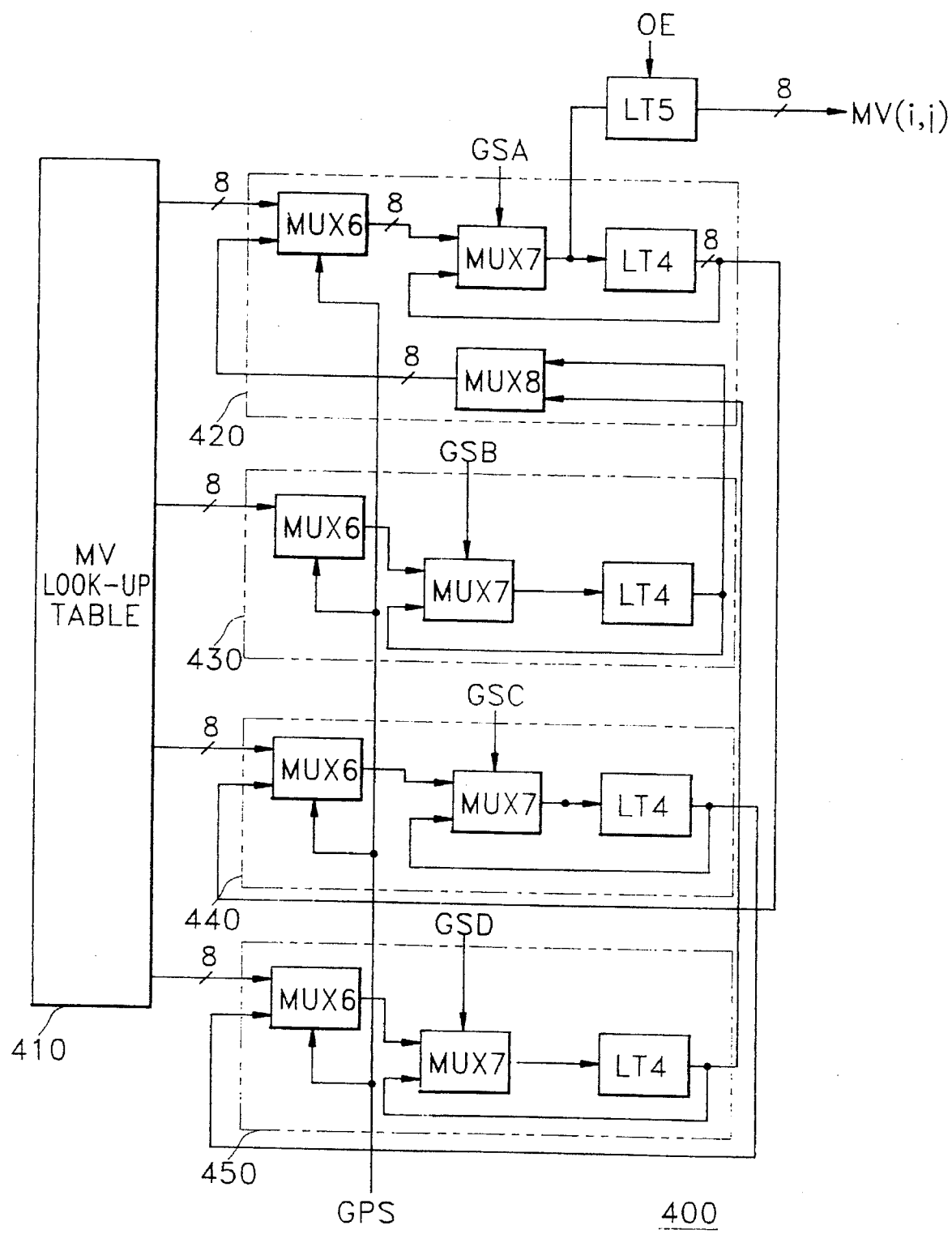
FIG. 9 is a circuit diagram of the motion vector generator shown in FIG. 2.

Referring to FIG. 9, MV generator 400 includes a motion vector (MV) look-up table 410 for sequentially generating the motion vectors corresponding to previous blocks PB of each group, group motion vector selectors 420, 430, 440 and 450, respectively, corresponding to the group minimum detectors of MAE detector 300, and an output latch LT5. The group MV selectors respectively include a first multiplexer MUX6 for selecting the motion vectors supplied from MV look-up table 410 and another group in response to group selection signal GPS, a second multiplexer MUX7 for selecting the input motion vector and the latched motion vector in response to each selection signal GSA through GSD supplied from MAE detector 300, and a latch LT4 for latching the motion vector selected in second multiplexer MUX7. First group MV selector 420 further has a third multiplexer MUX8 for selecting one between motion vectors selected from the second group and another group to thereby supply the selected motion vector to first multiplexer MUX6 thereof as the motion vector of another group. The output from second multiplexer MUX7 of first group MV selector 420 is supplied to output latch LT5. The output from latch LT4 of first group MV selector 420 is supplied to third group MV selector 440, and the output from latch LT4 of third group MV selector 440 is supplied to fourth group MV selector 450. The output from latch LT4 of second group MV selector 430 is supplied to first group MV selector 420, and the output from latch LT4 of fourth group MV selector 450 is supplied to first group MV selector 420.

Thus, MV generator 400 selects the previous block's motion vector corresponding to the minimum value detected by being synchronized to the minimum value detecting operation of MAE detector 300, thereby simultaneously producing and outputting the motion vector MV(i, j) of the previous block PB having the minimum error and the minimum absolute error.

Figure 10:
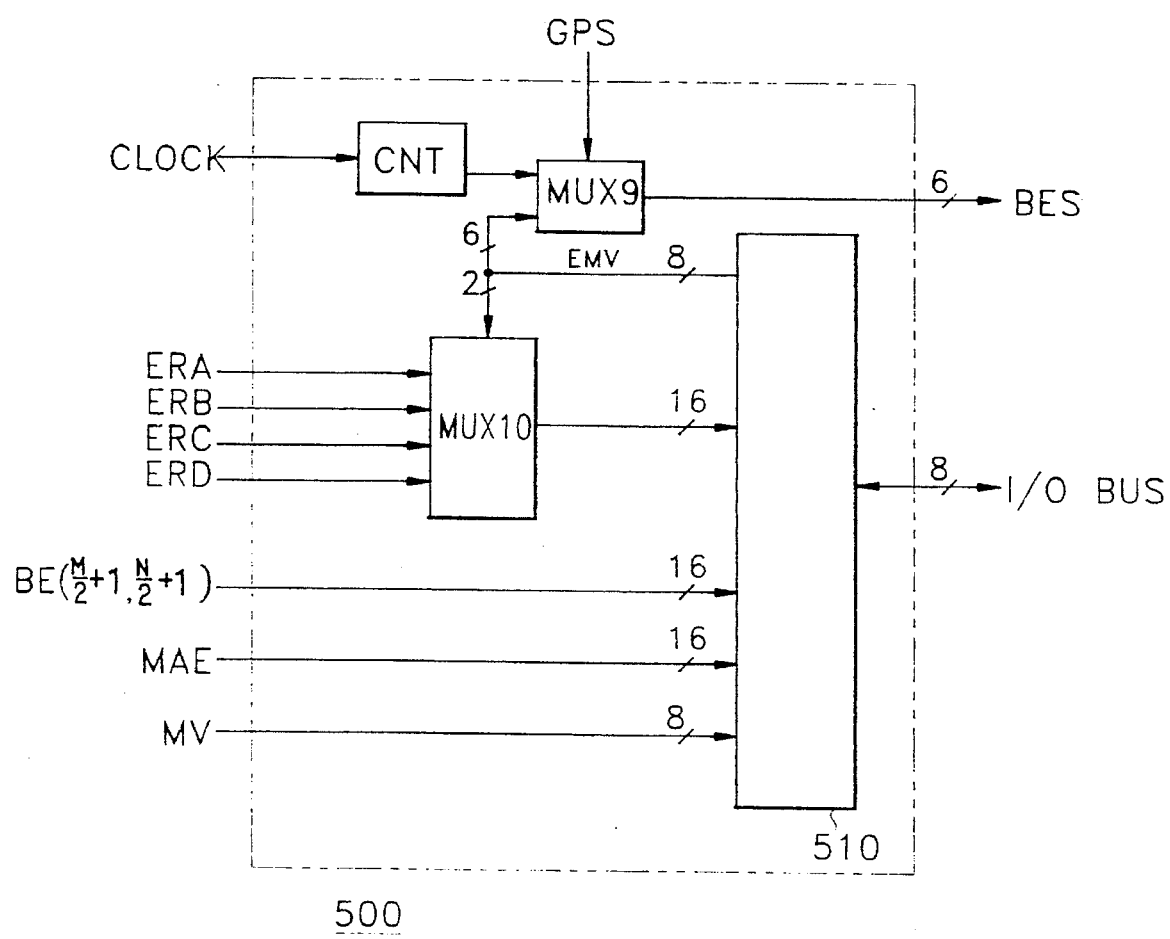
FIG. 10 is a circuit diagram of the output controller shown in FIG. 2.

Referring to FIG. 10, output controller 500 includes an I/O bus interface 5 10, a counter CNT, a first multiplexer MUX9 and a second multiplexer MUX10. Counter CNT which is a 64-mode counter for counting to 64 by inputting a clock signal, generates error selection signal BES. In response to a group selection signal GPS, first multiplexer MUX9 selects error selection signal BES generated from 64-mode counter CNT and an error selection signal input from an external portion, thereby outputting error selection control signal BES of MAE detector 300. Second multiplexer MUX10 selects block errors ERA, ERB, ERC and ERD of each group from MAE detector 300 in response to the externally input selection signal, and provides the selected one to I/O bus interface 510. I/O bus interface 510 receives the reference block error $$BE\left(\frac{M}{2}+1, \frac{N}{2}+1\right)$$

in case of no motion, minimum absolute error MAE, and MV, outputs them to the I/O bus, and provides a certain external motion vector EMV to first and second multiplexers MUX9 and MUX10 as 6-bit and 2-bit signals, respectively. Therefore, output controller 500 not only outputs the MAE and corresponding MV as motion estimating data but also generates a corresponding error by means of an external control signal OE in response to motion vector EMV input from an external unit, i.e., an external selector.

Control signal generator 600 receives a clock signal to thereby supply various control signals to respective units described above.

According to the present invention as described above, in order to minimize the number of I/O pins, a serial input system is utilized for data input from an external unit, all previous blocks and current blocks are simultaneously processed in parallel by means of a pipeline system in internal processing, and a minimum value among the processed groups of blocks is detected together with the selection of the corresponding motion vector. As a result, a high processing speed can be achieved which enables the estimation of real-time motion.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A real time motion estimation apparatus for performing one-to-one comparison of a current pixel block having a size M lines×N dots with a plurality of previous pixel blocks having said size of M lines×N dots within a search window having a size of (2M−1) lines×(2N−1) dots in order to obtain relative position information between said current pixel block and the previous pixel block most similar to said current pixel block, said relative position information representing motion information, said apparatus comprising:

previous block formation means simultaneously receiving first and second serial pixel data strings representing pixel data within said search window for sequentially outputting in parallel the pixel data corresponding, respectively, to each of said previous pixel blocks;

block-matching algorithm processing means, responsive to the output from said previous block formation means, for sequentially inputting said pixel data and a third serial pixel data string representing pixel data of said current pixel block and simultaneously performing the one-to-one comparison of each of said plurality of previous pixel blocks with said current pixel block in parallel, thereby outputting in parallel the respective absolute error data strings of the plurality of previous blocks with respect to the current pixel block;

minimum absolute error detecting means, responsive to the output from said block-matching algorithm processing means, for inputting and dividing said parallel absolute error data strings into a plurality of groups, obtaining respective minimum absolute error data for each group, and comparing said minimum absolute error data of said groups to one another to thereby produce a minimum absolute error data for said search window;

motion vector generating means for generating a motion vector corresponding to said minimum absolute error data produced in said search window, by being synchronized to the operation of said minimum absolute error detecting means for obtaining the minimum value; and output controlling means for outputting said absolute error data of a motion vector (0, 0), said produced minimum absolute error data, and said generated motion vector to an I/O bus, and selectively outputting the absolute error data, among a plurality of absolute error data strings, corresponding to an external motion vector input via said I/O bus, wherein both M and N are integers greater than 2; and wherein said first serial data string to said previous block formation means is a previous pixel data string input in a dot-string unit defining upper M lines of said search window, and said second serial data string is a previous pixel data string input in a dot-string unit defining lower M−1 lines of said search window.

2. An apparatus for estimating real time motion as claimed in claim 1, wherein said previous pixel block formation means comprises:

a first demultiplexer for demultiplexing said first serial data string;

M latches for latching the output signals of said first demultiplexer;

M×N first shift registers in a matrix configuration for horizontally shifting the latched data a first predetermined clock period and vertically shifting data supplied from lower registers to the upper registers second predetermined clock period, thereby generating formed serial pixel data strings of a previous pixel block having said size of M×N;

a second demultiplexer for demultiplexing said second serial data string;

M−1 latches for latching the output signals from said second demultiplexer; and (M−1)×N second shift registers in a matrix configuration for horizontally shifting said latched data at said first predetermined clock period, and recursively shifting data supplied from the lower registers to the upper registers at said second predetermined clock period, the uppermost line of said second shift registers being connected to the lowermost line of said first shift registers.

3. An apparatus for estimating real-time motion as claimed in claim 2, wherein each first shift register comprises:

a first flip-flop for latching and horizontally shifting data supplied after being horizontally shifted from an adjacent register;

a second flip-flop for latching said data vertically supplied from the lower registers; and a multiplexer for outputting the outputs from said first and second flip-flop as data selectively corresponding to the previous pixel.

4. An apparatus for estimating real-time motion as claimed in claim 2, wherein each second shift register comprises a multiplexer for selecting said data supplied after being horizontally shifted from an adjacent register and said data vertically supplied from the lower register, and a flip-flop for latching the data selected in said multiplexer to simultaneously shift said latched data horizontally and vertically, wherein the uppermost line of said second shift registers simultaneously supplies said data to the lowermost line of said first shift registers and to an adjacent one of said first shift register.

5. An apparatus for estimating real-time motion as claimed in claim 1, wherein said block-matching algorithm processing means comprises a plurality of block error producers corresponding to said plurality of previous pixel blocks, each of said block error producers including:

a subtractor for performing subtraction by sequentially subtracting said serial data strings of said previous pixel blocks and said serial data string of said current pixel block;

an absolute value producer for obtaining the absolute value of the result of said subtraction;

an accumulator for accumulating the obtained absolute value; and an output latch for outputting the result of the accumulation as an error value of said previous pixel block with respect to said current pixel block.

6. An apparatus for estimating real-time motion as claimed in claim 1, wherein said minimum absolute error detecting means comprises:

a plurality of first multiplexers for generating said serial error data strings for each of said groups by dividing said parallel error data strings from said block matching algorithm processing means;

a plurality of second multiplexers for selecting each of said serial error data strings and the minimum error data of another group;

a plurality of comparators for comparing said error data selected in said second multiplexer with previous error data to output the smaller value of the two as the minimum error data, and generating respective group selection signals when the minimum error data of a first group is of a smaller value than the minimum error data supplied from another group;

a third multiplexer for selectively supplying the result of the comparator of a second group and the result of the comparison of other groups except for said first group to the second multiplexer of said first group as said minimum error data of another group; and an output latch for outputting the minimum error data of the comparator of said first group as said minimum absolute error data within said search window.

7. An apparatus for estimating real-time motion as claimed in claim 6, wherein said motion vector generating means comprises:

a motion vector generator for generating a motion vector data string for each of said groups;

a plurality of fourth multiplexers for selecting said motion vector data string of said each group and motion vector data of another group;

a plurality of fifth multiplexers for selecting data selected in each of said fourth multiplexers and latched data in response to respective group selection signals of said minimum absolute error detecting means;

a plurality of latches for latching each data selected in said fifth multiplexers to supply the latched data to a respective one of said fifth multiplexers and to a respective one of said fourth multiplexers of another group;

a sixth multiplexer for selectively supplying said latched data of a predetermined group and the latched result of other groups except for a first group to the fourth multiplexer of said first group as data of another group; and an output latch for outputting the data selected in said fifth multiplexer of said first group as said motion vector corresponding to said minimum absolute error data within said search window.

8. An apparatus for estimating real-time motion as claimed in claim 7, wherein said output controlling means comprises:

an I/O buffer for outputting said produced minimum absolute error data, said motion vector and an error data string to an I/O bus, and inputting an external motion vector via said I/O bus;

a seventh multiplexer for generating said error data string by selecting said error data strings of said plurality of groups according to said external motion vector;

a counter for generating a selection signal for sequentially selecting said error data strings for each group; and an eighth multiplexer for selecting one of the output of said counter and said external motion vector to supply the selected one as a selection control signal of said plurality of first multiplexers of said minimum absolute error detecting means.

9. A real time motion estimation method for performing one-to-one comparison of a current pixel block having a size of M lines×N dots with a plurality of previous pixel blocks having the size of M lines×N dots within a search window having a size of (2M−1)lines×(2N−1) dots in order to obtain relative position information between said current pixel block and a previous pixel block most similar to said current pixel block said relative position information representing motion information, said method comprising the steps of:

simultaneously inputting first and second serial pixel data strings within said search window, and sequentially outputting in parallel the serial pixel data strings corresponding, respectively, to said previous pixel blocks;

sequentially inputting said serial pixel data strings and a third serial pixel data string of said current pixel block to simultaneously perform the one-to-one comparison of said plurality of previous pixel blocks with said current pixel block in parallel, thereby outputting, respectively, parallel absolute error data strings of said plurality of previous blocks with respect to said current pixel block;

inputting and dividing said parallel absolute error data strings into a plurality of groups, obtaining minimum absolute error data of each group, and comparing said minimum absolute error data of said groups to one another, thereby producing a minimum absolute error data within said search window;

generating a motion vector corresponding to said minimum absolute error data produced in said search window, by synchronizing to the operation of a minimum absolute error detecting means for obtaining the minimum value; and outputting said absolute error data of a motion vector (0, 0), said produced minimum absolute error data, and said generated motion vector to an I/O bus, and selectively outputting the absolute error data, among a plurality of absolute error data strings, corresponding to an external motion vector input via said I/O bus;

wherein said first serial data string to said previous block formation means is a previous pixel data string input in a dot-string unit defining upper M lines of said search window, and said second serial data string is a previous pixel data string input in a dot-string unit defining lower M−1 lines of said search window.

* * * * *